Patented Feb. 13, 1934

1,947,295

UNITED STATES PATENT OFFICE 1,947,295

STARCH PASTE

Stephen Józsa, New York, and Herbert C. Gore, Scarsdale, N. Y., assignors to Standard Brands Incorporated, Dover, Del., a corporation of Delaware No Drawing. Application January 11, 1930
Serial No. 420,286

9 Claims. (Cl. 127—32)

This invention relates to methods of preparing starch solutions of low viscosity, and has as a general object the preparation of such starch solutions in a convenient, efficient and economical manner.

An object of the invention is to provide a method of preparing starch pastes from readily available commercial forms of starch without special pretreatment thereof, or subsequent enzymatic treatment of the solution.

Another object of the invention is to provide a method of preparing a starch paste having a low viscosity, which has a homogeneous consistency, improved stability and penetrability, and is especially suitable for sizing and finishing textiles.

The invention accordingly comprises the several steps and the relation and order of one or more of such steps with respect to each of the others thereof, which will be exemplified in the method hereinafter disclosed, and the scope of the application of which will be indicated in the claims.

Heretofore it has been impossible to obtain a satisfactory state of dispersion in ordinary cooked starch paste, and the product has been unhomogeneous, of high viscosity, and has shown a marked tendency to gelatinize.

In accordance with the principles of the present invention, it is found that a starch paste having a starch content of as high as 10% can be prepared, which will have a uniform consistency, a relatively low viscosity, and will remain in a liquid form for a period of several months without gelatinization or precipitation. These improved qualities have been obtained by a method requiring no special pretreatment of the starch used, and including no subsequent special treatment of the starch paste, but rather by a mechanical operation resulting in the uniform dispersion of the starch and the rupture or disintegration of at least a portion of the cell walls of the starch granules in the paste.

This mechanical operation may be carried out in a number of ways without departing from the scope of the invention, as for example, by treating the starch paste with a high speed mixer, for example a mixer having a speed of at least 1200 R. P. M., or passing it through a colloid mill or other type of mill giving similar mechanical effects, as, for example, passing it between rapidly rotating and closely spaced discs, such as a mill in which the discs have a clearance of 0.003 mm.

As an example of a manner in which the present invention may be carried out, the starch paste may be prepared by heating about 1900 grams of water to boiling, adding 100 grams of starch previously admixed with about 200 cc. of water thereto, and vigorously stirring the mixture until the starch is gelatinized, and thereafter stirring the starch paste with a high speed mixer for about ten minutes. A suitable mixer is one such as is ordinarily used at soda fountains and has a speed of about 11,000 R. P. M.

The marked change in the physical properties of the starch paste thus produced is shown by the following table, showing time of outflow of the paste from a standard 100 cc. pipette having an outflow time of 53 seconds for water; the three columns at the right showing check results.

| Time of stirring | Outflow time in seconds from a 100 cc. pipette at 21° C. | | |
|---|---|---|---|
| 0 | Does not flow. | | |
| 1 minute | 315.0 | 314.0 | 311.2 |
| 2 minutes | 250.6 | 249.6 | 248.7 |
| 3 minutes | 221.8 | 222.4 | 222.8 |
| 4 minutes | 207.0 | 208.2 | 209.0 |
| 5 minutes | 200.7 | 202.5 | 206.2 |
| 6 minutes | 200.4 | 200.2 | 199.8 |
| 10 minutes | 181.8 | 182.0 | 179.8 |

Although the time of mixing necessary will depend upon the type of stirrer or mill used, desirable results are found to be obtained when the mixing is carried out in a manner and to a degree such that the outflow time of a 5% starch paste from a standard 100 c.c. pipette is approximately 200 seconds or less at 21° C., or expressed in other words, the outflow time of a 5% paste is approximately the same as the outflow time of a glycerol solution of 1.213 to 1.215 specific gravity at the same temperature from a 100 cc. pipette, and any improvement of the viscosity of the starch paste which attains this end is to be considered to be within the scope of the present invention. In its preferred embodiment, the invention contemplates a further similar treatment of the paste after it has cooled.

That the starch paste prepared in accordance with the principles of the present invention differs from usual starch pastes which have not been so treated is also indicated by the fact that if a portion thereof is treated with an $$\frac{N}{100}$$

iodine solution, the original starch paste stirred for only one minute showed a precipitate, whereas those pastes stirred for six or more minutes showed no precipitate. This was also confirmed by microscopic examination, which latter indicated that a considerable amount of the cell walls of the starch granules were ruptured by the stirring treatment.

A starch paste prepared in accordance with the principles of the present invention, if poured on a lacquered metal sheet and dried over night, forms a transparent, uniform and flexible film which indicates that in addition to the stability and low viscosity features of the starch above mentioned, it should be very useful in sizing of textiles, and in dye-printing textile materials, and in the paste, paper making and food industries. Furthermore, it is desired to point out that the starch paste prepared in the above described manner through the action of a high speed mixer may be converted into a dry product, well adapted for a variety of purposes by forcing a low viscosity starch paste through a spray nozzle in the usual manner, and thereby contacting in spray form with a drying medium. In this manner the starch product may be effectively dried as in the manner above described, namely by pouring onto a lacquered metal surface.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A method of preparing a starch paste having high stability and low viscosity, which comprises cooking starch in water to gelatinize the same, and thereafter subjecting the hot starch paste to the action of a high speed mixer until its viscosity has been lowered to an extent such that the outflow time of a 5% cold solution thereof from a standard 100 cc. pipette is approximately 200 seconds or lower.

2. A method of preparing a starch paste having high stability and low viscosity, which comprises cooking starch in water to gelatinize the same, and thereafter subjecting the hot starch paste to the action of a colloid mill until its viscosity has been lowered to an extent such that the outflow time of a 5% cold solution thereof from a standard 100 cc. pipette is approximately 200 seconds or lower.

3. A method of preparing a starch paste having high stability and low viscosity, which comprises cooking starch in water to gelatinize the same, and thereafter subjecting the hot starch paste to the action of a high speed mixer for a few minutes, allowing the paste to cool and thereafter subjecting it to a further treatment with a high speed mixer until its viscosity has been lowered to an extent such that the outflow time of a 5% cold solution thereof from a standard 100 cc. pipette is 200 seconds or lower.

4. A new composition of matter, a gelatinized and vigorously agitated starch paste having a viscosity such that a cold solution thereof containing 5% starch has an outflow time of approximately 200 seconds or less from a standard 100 cc. pipette at a temperature of about 21° C.

5. A method of preparing a starch paste having a high stability and low viscosity which comprises gelatinizing starch and thereafter subjecting the gelatinized starch to the action of a high speed mixer.

6. A method of preparing a starch paste having high stability and low viscosity which comprises gelatinizing starch and then subjecting the gelatinized starch to vigorous agitation until its viscosity has been lowered to an extent such that the outflow time of a 5% paste from a standard 100 cc. pipette is approximately 200 seconds or lower.

7. A method of preparing starch paste having high stability and low viscosity which comprises cooking starch in water until the starch is gelatinized and thereafter subjecting the gelatinized starch to vigorous agitation until its viscosity has been lowered to an extent such that the outflow time of a 5% paste from a standard 100 cc. pipette is approximately 200 seconds or lower.

8. A method of preparing a starch paste having high stability and low viscosity which comprises gelatinizing starch and subjecting the gelatinized starch to the action of a high speed mixer having a speed of about 11,000 R. P. M.

9. A method of preparing a starch paste having high stability and low viscosity which comprises heating about 100 parts of starch with about 2100 parts of water to boiling, stirring until the starch has been gelatinized and thereafter subjecting the starch paste to the action of a high speed mixer having a speed of about 11,000 R. P. M. for a period of about 10 minutes.

STEPHEN JOZSA.
HERBERT C. GORE.